US012136371B2

(12) United States Patent
Shen et al.

(10) Patent No.: US 12,136,371 B2
(45) Date of Patent: Nov. 5, 2024

(54) CONTROL CIRCUIT OF DISPLAY PANEL AND DISPLAY DEVICE

(71) Applicant: HKC CORPORATION LIMITED, Shenzhen (CN)

(72) Inventors: Tingting Shen, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/012,018

(22) PCT Filed: Jun. 9, 2022

(86) PCT No.: PCT/CN2022/097860
§ 371 (c)(1),
(2) Date: Dec. 21, 2022

(87) PCT Pub. No.: WO2023/005443
PCT Pub. Date: Feb. 2, 2023

(65) Prior Publication Data
US 2024/0242650 A1 Jul. 18, 2024

(30) Foreign Application Priority Data
Jul. 30, 2021 (CN) ......................... 202110876023.9

(51) Int. Cl.
*G09G 3/20* (2006.01)

(52) U.S. Cl.
CPC ....... *G09G 3/20* (2013.01); *G09G 2310/0267* (2013.01)

(58) Field of Classification Search
CPC ............. G09G 3/20; G09G 2310/0267; G09G 3/3266; G09G 5/18; G09G 3/36; G09G 3/3275
See application file for complete search history.

(56) References Cited

U.S. PATENT DOCUMENTS 8,829,944 B1 9/2014 Miller
2007/0063758 A1 3/2007 Allard et al.
(Continued)

FOREIGN PATENT DOCUMENTS

CN 102651207 A 8/2012
CN 103475341 A 12/2013
(Continued)

OTHER PUBLICATIONS

Office Action issued on Jan. 18, 2024, in corresponding Japanese Application No. 2022-576403, 10 pages.
(Continued)

*Primary Examiner* — Richard J Hong
(74) *Attorney, Agent, or Firm* — Maier & Maier, PLLC

(57) ABSTRACT

A control circuit of a display panel, and a display device. The control circuit of a display panel is configured to receive a first clock signal, a first level signal and a second level signal, phase-shift the first clock signal to obtain a second clock signal according to the first level signal and the second level signal and output the second clock signal to a gate drive circuit. The clock signal is phase-shifted to reduce the load of a single clock signal and minimize the number of clock generators in the display panel, thereby reducing the production cost of the display panel.

20 Claims, 10 Drawing Sheets

(56) References Cited

U.S. PATENT DOCUMENTS

| | | | | |
|---|---|---|---|---|
| 2010/0085348 | A1 | 4/2010 | Bae et al. | |
| 2014/0035891 | A1* | 2/2014 | Tanaka | G09G 3/36 345/204 |
| 2014/0104248 | A1 | 4/2014 | Won et al. | |
| 2017/0287425 | A1* | 10/2017 | Koo | G09G 5/18 |
| 2019/0005866 | A1* | 1/2019 | Li | G09G 3/3266 |
| 2023/0162688 | A1* | 5/2023 | Lee | G09G 3/3275 345/212 |

FOREIGN PATENT DOCUMENTS

| | | | |
|---|---|---|---|
| CN | 104810004 | A | 7/2015 |
| CN | 104851402 | A | 8/2015 |
| CN | 106411302 | A | 2/2017 |
| CN | 106710561 | A | 5/2017 |
| CN | 107871480 | A | 4/2018 |
| CN | 109427277 | A | 3/2019 |
| CN | 112470210 | A | 3/2021 |
| CN | 113223447 | A | 8/2021 |
| CN | 113570998 | A | 10/2021 |
| JP | S54118783 | A | 9/1979 |
| JP | H6152374 | A | 5/1994 |
| JP | H9511104 | A | 11/1997 |
| JP | H11317653 | A | 11/1999 |
| JP | 2001508635 | A | 6/2001 |
| JP | 2009212571 | A | 9/2009 |
| KR | 1020080001489 | A | 1/2008 |
| KR | 1020110077868 | A | 7/2011 |
| KR | 1020150069356 | A | 6/2015 |
| KR | 20170034204 | A | 3/2017 |
| KR | 1020200028452 | A | 3/2020 |
| KR | 1020210081008 | A | 7/2021 |
| WO | 2018161806 | A1 | 9/2018 |

OTHER PUBLICATIONS

International Search Report mailed Aug. 31, 2022, in corresponding International Application No. PCT/2022/097860, 5 pages.

Office Action issued on Jun. 25, 2024, in corresponding Japanese Application No. 2022-576403, 10 pages.

* cited by examiner

CONTROL CIRCUIT OF DISPLAY PANEL AND DISPLAY DEVICE

CROSS-REFERENCE TO RELATED APPLICATIONS

This application is a U.S. national phase of International Patent Application No. PCT/CN2022/097860 with an international filing date of Jun. 9, 2022, designating the U.S., now pending, which claims the priority from Chinese patent application No. 202110876023.9, titled "Control circuit of display panel and display device" filed on Jul. 30, 2021, the contents of which are incorporated herein by reference.

TECHNICAL FIELD

The present application relates to the field of display technology, and in particular, to a control circuit of a display panel, and a display device.

BACKGROUND

With the rapid development of display technology, display panels are commonly used in various fields such as entertainment, education, security, and the like. Gate driver less (GDL) technology involves the direct fabrication of gate driver ICs on array substrates and the output of line driver signals to achieve progressive scanning of the gate. GDL technology simplifies the preparation process of display panels, by reducing the bonding process along the direction of the horizontal scan lines, and reduces production costs, while improving the integration of display panels which results in thinner and lighter display panels.

Display panels using GDL technology need multiple clock signals to control the gate drive circuits to output line drive signals. As the size and resolution of display panels continue to increase, the number of gate drive circuits for each display panel also increases, resulting in an excessive load on a single clock signal, making the display panel less stable in operation.

SUMMARY

Embodiments of the present application provide a control circuit of a display panel, and a display device, in order to solve problems such as an increasing number of gate drive circuits of existing display panels using GDL technology which leads to an excessive load on individual clock signals, making the operation of display panels less stable.

Technical proposals provided by the present application are as follows.

In a first aspect, a control circuit of a display panel is provided, the control circuit is configured to receive a first clock signal, a first level signal and a second level signal, phase-shift the first clock signal to obtain a second clock signal according to the first level signal and the second level signal, and output the second clock signal to a gate drive circuit; the second clock signal includes a third level signal and a fourth level signal, the third level signal and the fourth level signal are at different levels.

The control circuit includes a first switch unit and a second switch unit connected to the first switch unit.

The first switch unit is configured to receive the first clock signal, the first level signal and the second level signal, and output the third level signal to the gate drive circuit based on the first clock signal, the first level signal and the second level signal.

The second switch unit is configured to receive the first clock signal, the first level signal and the second level signal, and output the fourth level signal to the gate drive circuit according to the first clock signal, the first level signal and the second level signal.

In a second aspect, a display device is provided, which includes a display panel; and a control unit, including the control circuit in the above-mentioned first aspect.

The control circuit of a display panel provided in the first aspect of the present application is configured to receive a first clock signal, a first level signal and a second level signal, and the first clock signal is phase-shifted to obtain a second clock signal to be output to a gate drive circuit according to the first level signal and the second level signal. The phase-shifting of the clock signal reduces the load of individual clock signals as well as the number of clock generators in the display panel, and lowers the production cost of the display panel.

It is understood that the advantageous effects of the above second aspect can be referred to the relevant description in the above first aspect and will not be repeated herein.

DETAILED DESCRIPTION OF THE EMBODIMENTS

In the following description, specific details such as particular system structures, techniques, and the like are presented for the purpose of illustration and not for limitation, in order to provide a thorough understanding of embodiments of the present application. However, it should be understood by those skilled in the art that the present application can be implemented in other embodiments without these specific details. In other instances, detailed descriptions of well-known systems, devices, circuits, and methods are omitted so that unnecessary details do not interfere with the description of the present application.

The terms “first”, “second”, and “third” are merely used for descriptive purposes, and cannot be understood as indicating or implying relative importance of indicated technical features.

References to “an embodiment” or “some embodiments” etc. described in the description of the present application imply that one or more embodiments of the present application include a particular feature, structure or characteristic described in combination with that embodiment. Accordingly, “in an embodiment”, “in some embodiments”, “in some other embodiments”, and the like do not necessarily refer to the same embodiment, but imply “one or more but not all embodiments” unless otherwise specifically emphasized. The terms “including,” “comprising,” “having,” and variations thereof all mean “including but not limited to,” unless otherwise specifically emphasized.

An embodiment of the present application provides a control circuit of a display panel, which can be applied to a display panel, and the display panel may be a liquid crystal display panel based on thin film transistor liquid crystal display (TFT-LCD) technology, a liquid crystal display panel based on LCD, an organic electroluminescence display panel based on organic light-emitting diode (OLED) technology, a quantum dot light-emitting diode display panel based on quantum dot light emitting diodes (QLED) technology, or a curved display panel, etc.

Figure 1:
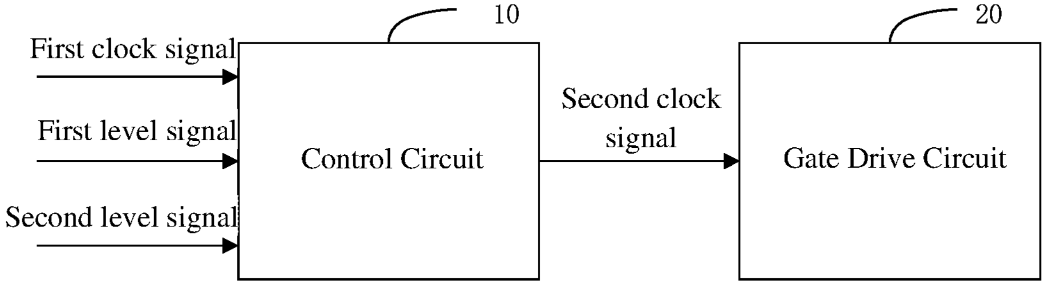
FIG. 1 is a schematic diagram of a first structure of the control circuit of a display panel according to an embodiment of the present application.
Figure 2:
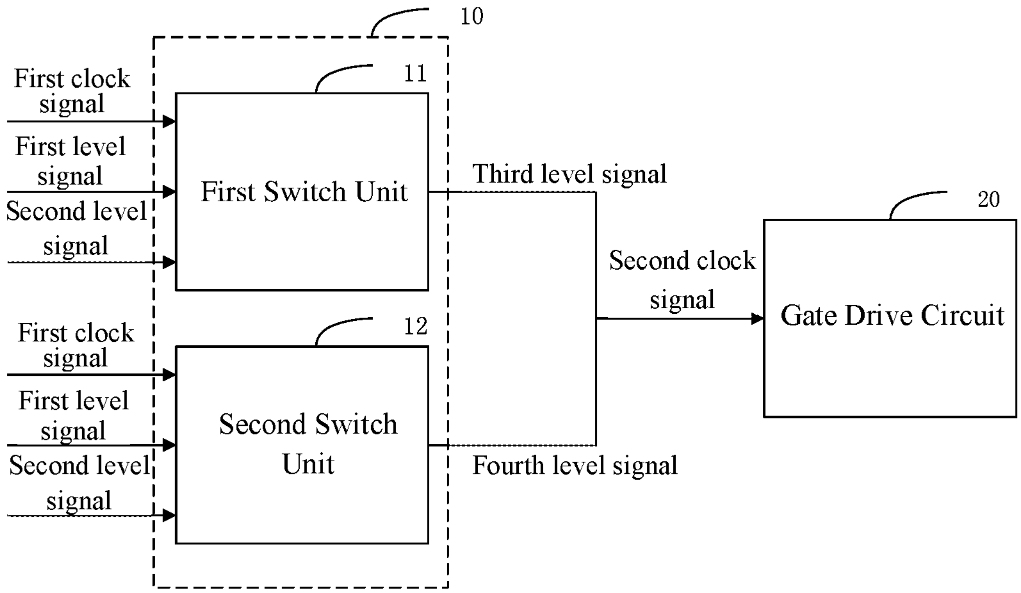
FIG. 2 is a schematic diagram of a second structure of the control circuit of a display panel according to an embodiment of the present application.

As shown in FIG. 1 or 2, the control circuit 10 of a display panel provided in an embodiment of the present application, the control circuit 10 is used for receiving a first clock signal, a first level signal and a second level signal. The first clock signal is phase shifted to obtain a second clock signal according to the first level signal and the second level signal, and the second clock signal is output to the gate drive circuit 20. The second clock signal includes a third level signal and a fourth level signal, and the third level signal and the fourth level signal are at different levels.

The control circuit 10 includes a first switch unit 11 and a second switch unit 12 connected to the first switch unit 11.

The first switch unit 11 is configured to receive the first clock signal, the first level signal and the second level signal, and to output the third level signal to the gate drive circuit 20 based on the first clock signal, the first level signal and the second level signal.

The second switch unit 12 is configured to receive the first clock signal, the first level signal and the second level signal, and to output the fourth level signal to the gate drive circuit 20 according to the first clock signal, the first level signal and the second level signal.

FIG. 1 illustrates an exemplary connection relationship between the control circuit and the gate driver circuit, the input and output signals of the control circuit, and the input signals of the gate driver circuit. FIG. 2 illustrates, on the basis of FIG. 1, the control circuit including the first switch unit and the second switch unit, and the input and output signals of the first switch unit and the second switch unit.

In practical applications, the control circuit may include a plurality of electronic components such as transistors, comparators, logic gates, resistors, capacitors or inductors. The first clock signal, the first level signal and the second level signal may be input to the control circuit by a timer control register (TCON) or a system on chip (SOC). The first clock signal may be phase shifted by the control circuit according to the first level signal and the second level signal, and a phase difference between the second clock signal obtained by phase shifting and the first clock signal may range from 0 to 180 degrees, moreover, the phase difference between the second clock signal and the first clock signal may be determined according to the time sequence of the first level signal and the second level signal. Both the first clock signal and the second clock signal may be output to the gate drive circuit to control the output of the line drive signals from the gate drive circuit, in order to perform progressive scanning of the gates of the display panel. Specifically, a display panel may include at least one control circuit, the number of the control circuits is determined according to the number of the above-mentioned clock signals used in the display panel, each control circuit corresponds to one first clock signal, an nth control circuit receives an nth first clock signal, and the nth first clock signal is shifted to obtain an nth second clock signal corresponding to the nth first clock signal. After the second clock signal shifted by each control circuit is output to the gate drive circuits, the gate drive circuits control the output of any number of line drive signals to scan the gates of the display panel line by line according to the actual needs. In contrast to outputting n first clock signals into the gate drive circuits, by generating n second clock signals corresponding to the n first clock signals though the control circuit, a total of 2n clock signals, n first clock signals and n second clock signals, can be input into the gate drive circuits. Since a single clock signal can be input to a plurality of gate drive circuits, when the number of clock signals is increased, the number of gate drive circuits into which the single clock signal is input can be reduced, thus the load on the single clock signal can be reduced, and the number of clock generators used to generate clock signals can be minimized, lowering the production cost of display panel. n is an integer greater than 0. The number of control circuits can be determined according to the actual needs of the display panel.

Figure 3:
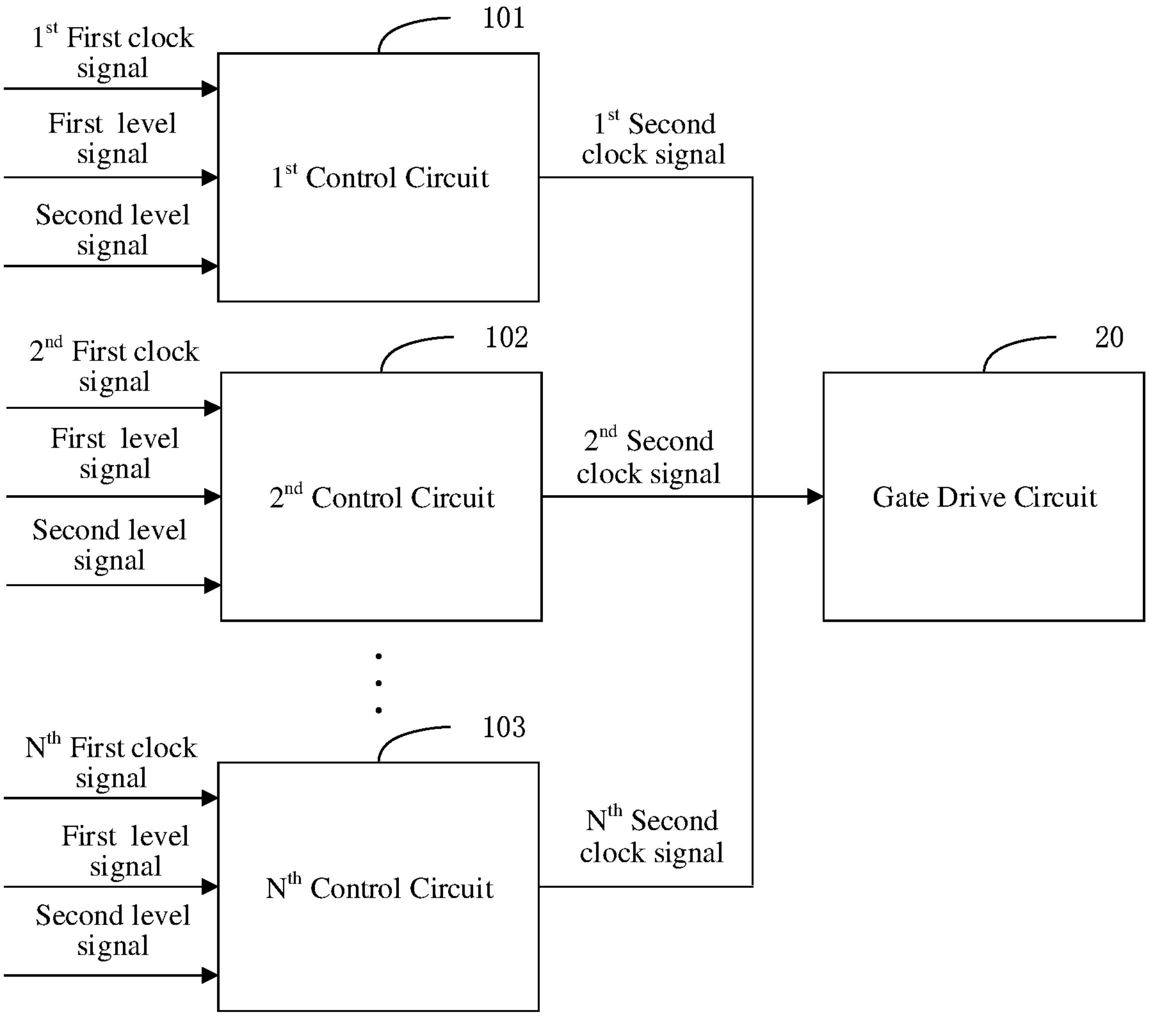
FIG. 3 is a schematic diagram of a third structure of the control circuit of a display panel according to an embodiment of the present application.

FIG. 3 shows an exemplary schematic diagram of the connection between the first control circuit 101, the second control circuit 102, and the nth control circuit 103 and the gate drive circuit 20.

In a practical application, the control circuit may include a plurality of switch units, each is capable of determining whether to output a level signal according to the level of the first clock signal, specifically, the control circuit may include a first switch unit and a second switch unit, where the first switch unit is used to control the output of the third level signal according to the first clock signal, and the second switch unit is used to control the output of the fourth level signal according to the first clock signal. For example, when the first clock signal is at a high level, the first switch unit may stop outputting the third level signal and the second switch unit may start outputting the fourth level signal; when the first clock signal is at a low level, the first switch unit may start outputting the third level signal and the second switch unit may stop outputting the fourth level signal. It should be noted that as the display panel is in an operating state, the levels of the third level signal and the fourth level signal are different, specifically, when the third level signal is high, the fourth level signal is low, or, when the third level signal is low, the fourth level signal is high, so that a continuous uninterrupted second clock signal can be obtained by integrating the third level signal output by the first switch unit and the fourth level signal output by the second switch unit.

In an embodiment, the first level signal is at a high level and the second level signal is at a low level.

In an embodiment, when the first clock signal is at a low level, the first switch unit 11 is turned on and outputs the third level signal at a high level to the gate drive circuit 20 based on the first clock signal, the first level signal and the second level signal; and when the first clock signal is at a high level, the first switch unit 11 is turned off and stops outputting the third level signal to the gate drive circuit 20 based on the first clock signal, the first level signal and the second level signal.

When the first clock signal is at a high level, the second switch unit 12 is turned on and outputs the fourth level signal at a low level to the gate drive circuit 20 based on the first clock signal, the first level signal and the second level signal; and when the first clock signal is at a low level, the second switch unit 12 is turned off and stops outputting the fourth level signal to the gate drive circuit 20 based on the first clock signal, the first level signal and the second level signal.

In a practical application, as the control circuit is in the operating state, when the first clock signal is at the low level, the first switch unit is turned on and outputs the third level signal to the gate drive circuit, the third level signal being at the high level, and the second switch unit is turned off and stops outputting the fourth level signal to the gate drive circuit, thus no fourth level signal being output, so that the second clock signal is at the high level at this point; when the first clock signal is at the high level, the first switch unit is turned off and stops outputting the third level signal to the gate drive circuit, thus no third level signal being output, and the second switch unit is turned on and outputs the fourth level signal to the gate drive circuit, the fourth level signal being at the low level, so that the second clock signal is at the low level at this point. Therefore, the first clock signal is phase shifted to obtain the second clock signal, and the phase difference between the second clock signal and the first clock signal is 90 degrees.

Figure 4:
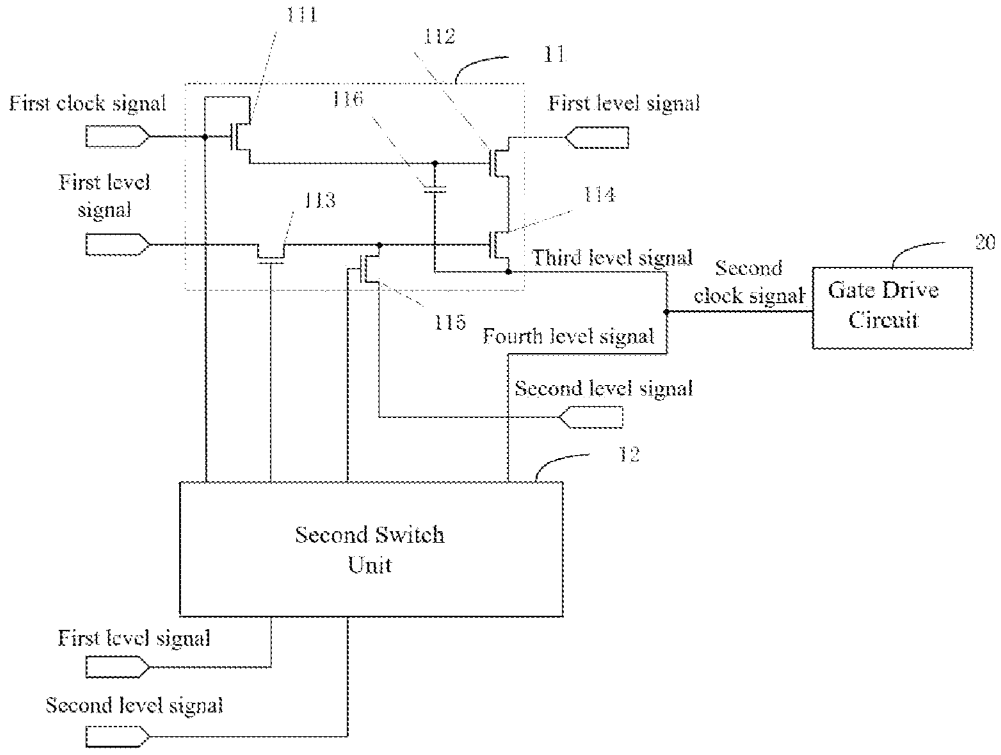
FIG. 4 is a schematic diagram of a fourth structure of the control circuit of a display panel according to an embodiment of the present application.

As shown in FIG. 4, in a further embodiment to the embodiment shown in FIG. 2, the first switch unit 11 includes a first electronic switch 111, a second electronic switch 112, a third electronic switch 113, a fourth electronic switch 114, a fifth electronic switch 115 and a first capacitor 116.

A drain of the first electronic switch 111 is connected to a gate of the second electronic switch 112, and a gate and a source of the first electronic switch 111 is configured to receive the first clock signal.

A drain of the second electronic switch 112 is connected to a source of the fourth electronic switch 114, and a source of the second electronic switch 112 is configured to receive the first level signal.

A drain of the third electronic switch 113 is connected to a source of the fifth electronic switch 115 and a gate of the fourth electronic switch 114, respectively, and a source of the third electronic switch 113 is configured to receive the first level signal.

A first terminal of the first capacitor 116 is connected to the drain of the first electronic switch 111 and a gate of the second electronic switch 112, respectively, and a drain of the fifth electronic switch 115 is configured to receive the second level signal.

A gate of the third electronic switch 113, the drain of the fifth electronic switch 115, a drain of the fourth electronic switch 114, and a second terminal of the first capacitor 116 are electrically connected to the second switch unit.

In practical applications, the first to fifth electronic switches may be any component or circuit having an electronic switching function, for example, may be a triode or a metal oxide semiconductor field effect transistor (MOSFET), and specifically, may be a thin film field effect transistor (TFT). The first capacitor may be different types of capacitors such as a ceramic capacitor, an aluminum electrolytic capacitor, a mica capacitor, a paper dielectric capacitor, a tantalum-niobium electrolytic capacitor, or a film capacitor, etc. The type of the first capacitor and its capacitance may be selected according to the actual needs.

Figure 5:
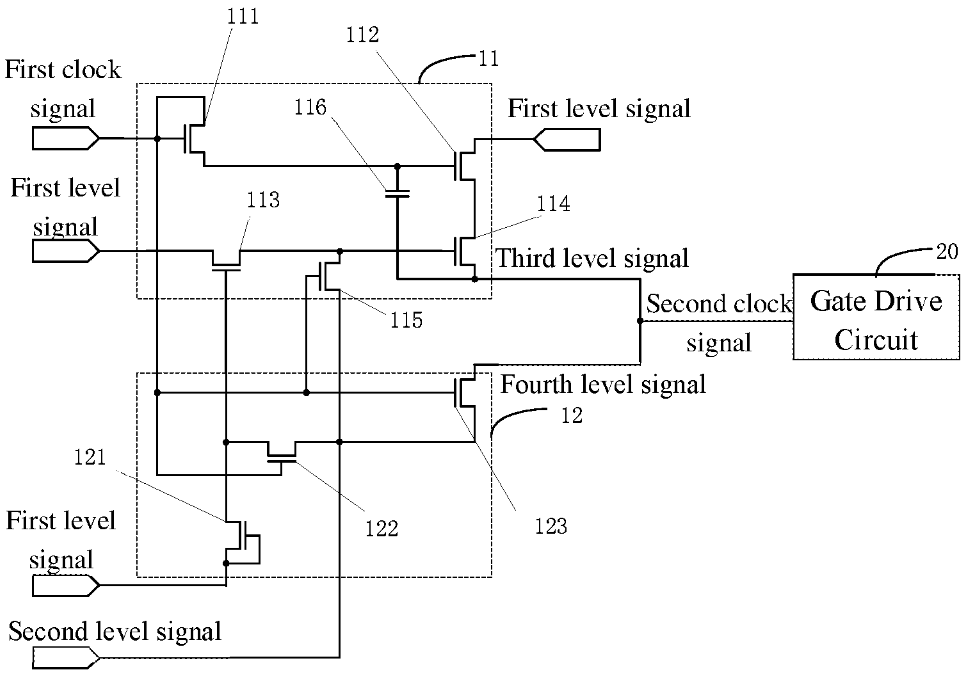
FIG. 5 is a schematic diagram of a fifth structure of the control circuit of a display panel according to an embodiment of the present application.

As shown in FIG. 5, in a further embodiment based on the embodiment corresponding to FIG. 4, the second switch unit 12 includes a sixth electronic switch 121, a seventh electronic switch 122, and an eighth electronic switch 123.

A drain of the sixth electronic switch 121 is connected to the gate of the third electronic switch and a source of the seventh electronic switch 122, respectively, a gate and a source of the sixth electronic switch 121 is configured to receive the first level signal.

A drain of the seventh electronic switch 122 is connected to the drain of the fifth electronic switch and a source of the eighth electronic switch 123, respectively, and a gate of the seventh electronic switch 122 is configured to receive the first clock signal and the drain of the seventh electronic switch 122 is configured to receive the second level signal.

A drain of the eighth electronic switch 123 is connected to the drain of the fifth electronic switch and the second terminal of the first capacitor, and a gate of the eighth electronic switch 123 is configured to receive the first clock signal.

In practical applications, the types of the components for the sixth to eighth electronic switches are the same as those for the above-mentioned first to fifth electronic switches, and are not repeated herein.

Figure 6:
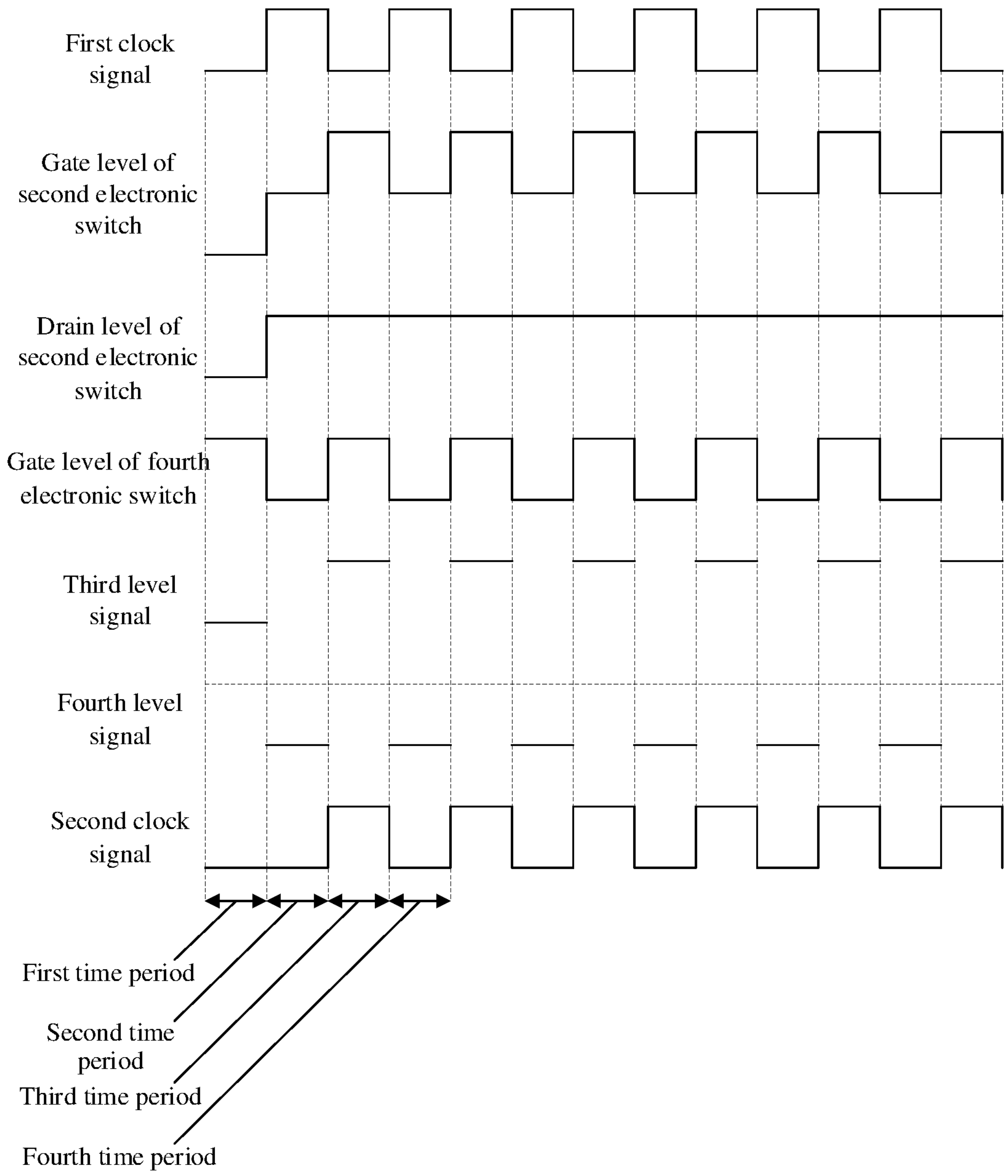
FIG. 6 is a sequence diagram of the first clock signal, the gate level of the second electronic switch, the drain level of the second electronic switch, the gate level of the fourth electronic switch, the third level signal, the fourth level signal and the second clock signal according to an embodiment of the present application.

FIG. 6 shows an exemplary sequence diagram of the first clock signal, the gate level of the second electronic switch, the drain level of the second electronic switch, the gate level of the fourth electronic switch, the third level signal, the fourth level signal and the second clock signal.

In a practical application, the first level signal is always at a high level, and the second level signal is always at a low level. The first clock signal is a periodical clock signal, which has a phase difference between a rising edge and an adjacent trailing edge at 90 degrees. The control circuit enters a standby state before the operating state. The control circuit enters a first standby state in a first time period, and the first clock signal is at the low level, thus the first electronic switch is turned off in the first time period, and the drain level of the first electronic switch is at the low level. The gate level of the second electronic switch is thus at the low level, and the second electronic switch is off, hence the drain level of the second electronic switch is low. Therefore, the source level of the fourth electronic switch is at the low level. Both the gate and source of the sixth electronic switch receive the first level signal, which causes the sixth electronic switch to be turned on and the drain level thereof is at the high level. Correspondingly, the gate level of the third electronic switch is at the high level, which causes the third electronic switch to be turned on, and since the source of the third electronic switch receives the first level signal, so the drain level of the third electronic switch is at the high level. Correspondingly, the gate level of the fourth electronic switch is at the high level, thus the fourth electronic switch is turned on, and since the source level of the fourth electronic switch is at the low level, the drain level of the fourth electronic switch is also low, and the third level signal is output at a low level. Since the first clock signal input is at the low level, the fifth electronic switch, the seventh electronic switch and the eighth electronic switch are turned off within the first time period and no fourth level signal is output by the eighth electronic switch. Accordingly, since the third level signal is low, and no fourth level signal is output, therefore, the second clock signal is at the low level. It should be noted that in the first standby state, the voltage magnitude of the third level signal and the fourth level signal are different, specifically, the third level signal may be low level, and specifically may be −3 V, −5 V, −6 V or −8 V, and the like, and the voltage of the fourth level signal may be 0V. The specific voltage value of low levels and high levels are not limited in the embodiments of the present application.

In a practical application, the control circuit enters the second standby state in a second time period, and the first clock signal is changed from a low level in the first time period to a high level. Thus, in the second time period, the first electronic switch is turned on and the drain level thereof is at the high level. The gate level of the second electronic switch is hence at the high level, thus the second electronic switch is turned on, and since the source of the second electronic switch receives the first level signal, the drain level of the second electronic switch is therefore at the high level. As the seventh electronic switch is turned on by the high-level first clock signal received at the gate thereof, the high-level output from the drain of the sixth electronic switch can be released via the seventh electronic switch and the second level signal, so that the gate level of the third electronic switch drops from the high level to a low level, thus the third electronic switch is turned off. Furthermore, as the fifth electronic switch is turned on by the high-level first clock signal received at the gate thereof, the high level at the source of the fifth electronic switch is released via the fifth electronic switch and the second level signal, therefore, combined with the turned off third electronic switch, the source level of the fifth electronic switch drops from the high level to a low level. Accordingly, the gate level of the fourth electronic switch drops from the high level to a low level, thus the fourth electronic switch is turned off, stopping the output of the third level signal. Since the eighth electronic switch is turned on by the high-level first clock signal received at the gate thereof, the drain level of the eighth electronic switch is low due to the low second level signal received at the source thereof, and thus the fourth level signal is at the low level. Accordingly, since the output of the third level signal is stopped and the fourth level signal is at the low level, so that the second clock signal is at the low level.

In a practical application, the control circuit enters a first operating state in a third time period, during which the second clock signal is at a high level and the first clock signal changes from the high level in the second time period to the low level, thus the first electronic switch is turned off in the third time period; whereas since the voltage at the gate of the second electronic switch is a float voltage, assuming that the current voltage at the gate of the second electronic switch is the first voltage, the gate level of the second electronic switch is still high, and the second electronic switch is on, so that the drain level of the second electronic switch is at the high level in accordance with the drain level of the second electronic switch in the second time period. The state of the third electronic switch is the same as that in the first time period described above, and is not repeated herein. Due to the low input level of the first clock signal, the gate level of the fifth electronic switch is low and the fifth electronic switch is turned off, while the gate level of the fourth electronic switch is high, and as the source level of the fourth electronic switch is at the high level, thus the third level signal is at the high level. Since the first clock signal is at the low level, the gate levels of the seventh and eighth electronic switches are both low, the seventh electronic switch is turned off and the eighth electronic switch is switched off and stops outputting the fourth level signal. Accordingly, since the third level signal is at the high level and no fourth level signal is output, hence the second clock signal is at the high level. In addition, due to the high-level third level signal and the float voltage at the gate of the second electronic switch, the first voltage at the gate of the second electronic switch is raised to a second voltage by the coupling effect of the first capacitor, where the value of the first voltage is determined by the voltage value when the first clock signal is at the high level, and the value of the second voltage is determined by the voltage value when the first clock signal at the high value and the coupling effect of the first capacitor.

In a practical application, the control circuit enters a second operating state in a fourth time period during which the second clock signal is at the low level, and the first clock signal changes from the low level in the third time period to the high, thus the first electronic switch is turned on in the fourth time period. The float voltage at the gate of the second electronic switch is eliminated, and the voltage at the gate of the second electronic switch is restored from the second voltage to the first voltage, hence the second electronic switch is turned on, and the drain level of the second electronic switch in the fourth time period is at the high level, same as the drain level of the second electronic switch in the third time period. As the seventh electronic switch is turned on by the high-level first clock signal received at the gate thereof, the high level output from the drain of the sixth electronic switch can be released via the seventh electronic switch and the second level signal, so that the gate level of the third electronic switch drops from the high level to the low level and the third electronic switch is turned off. Furthermore, as the fifth electronic switch is turned on by the high-level first clock signal at the gate thereof, the high level at the source of the fifth electronic switch is released through the fifth electronic switch and the second level signal, therefore, combined with the turn-off of the third electronic switch, the source level of the fifth electronic switch drops from high to low, then the gate level of the fourth electronic switch drops from high to low, and the fourth electronic switch is turned off and stops outputting the third level signal. Moreover, the eighth electronic switch is turned on by the high-level first clock signal at the gate thereof, and the second level signal received at the source of the eighth electronic switch is at the low level, so that the drain level of the eighth electronic switch is low and thus the fourth level signal is at the low level. Since no third level signal is output and the fourth level signal is at the low level, therefore, the second clock signal is at the low level.

In practical applications, the operating state of the control circuit changes with the level of the first clock signal after the preparation in the first time period and the second time period. Specifically, when the first clock signal is at the low level, the operating state of the control circuit is in accordance with the first operating state in the third time period described above, and when the first clock signal is at the high level, the operating state of the control circuit is in accordance with the second operating state in the fourth time period described above. Thus, the clock signal can be shifted, with a phase difference between the second clock signal output by the control circuit and the first clock signal of 90 degrees, which reduces the load of a single clock signal, and also minimizes the number of clock generators in the display panel, thereby lowering the production cost of the display panel.

Figure 7:
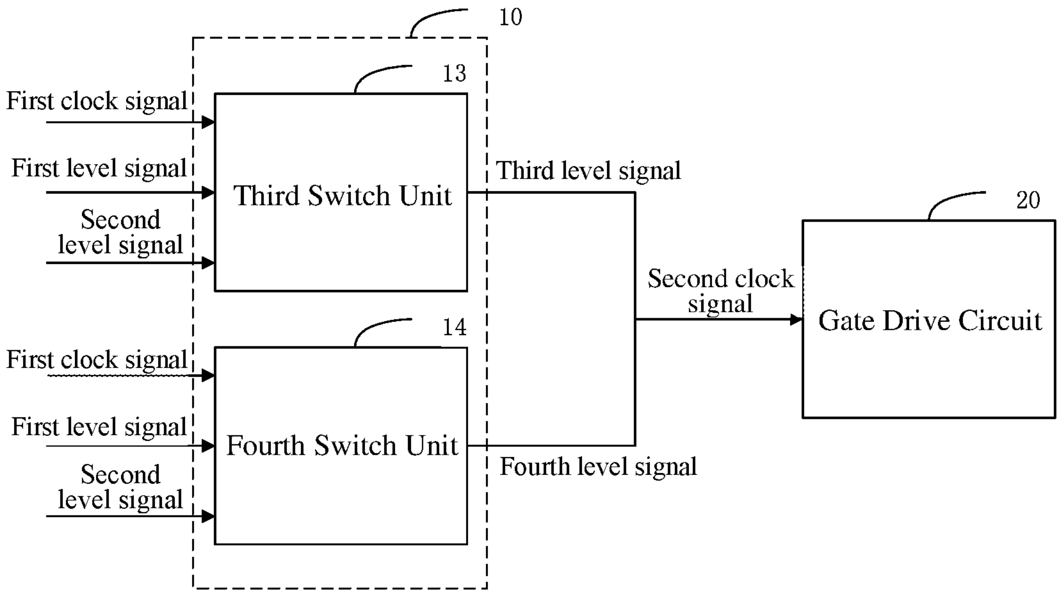
FIG. 7 is a schematic diagram of a sixth structure of the control circuit of a display panel according to an embodiment of the present application.

As shown in FIG. 7, in an embodiment, based on the embodiment corresponding to FIG. 1, the control circuit 10 includes:

a third switch unit 13 for receiving the first clock signal, the first level signal and the second level signal, and when the first clock signal is at the high level, the third switch unit 13 is turned on and outputs a fifth level signal to the gate drive circuit 20 based on the first clock signal, the first level signal and the second level signal, where the fifth level signal is at a high level; and when the first clock signal is at the low level, the third switch unit 13 is turned on and outputs the fifth level signal to the gate drive circuit 20 based on the first clock signal, the first level signal and the second level signal, where the fifth level signal is at a low level:

a fourth switch unit 14 connected to the third switch unit 13, the fourth switch unit 14 receives the first clock signal, the first level signal and the second level signal, and when the first clock signal is at the high level, the fourth switch unit 14 is turned on and outputs a sixth level signal to the gate drive circuit 20 based on the first clock signal, the first level signal and the second level signal, where the sixth level signal is at a low level; and when the first clock signal is at the low level, the fourth switch unit 14 is turned off and stops outputting the sixth level signal based on the first clock signal, the first level signal and the second level signal.

The second clock signal includes the fifth level signal and the sixth level signal.

In practical applications, as the control circuit enters the operating state, when the first clock signal is at the low level, the third switch unit is turned on and outputs the high-level fifth level signal to the gate drive circuit, and the fourth switch unit is turned off and stops outputting the sixth level signal to the gate drive circuit, namely no sixth level signal is output, and thus the second clock signal is at the high level; when the first clock signal is at the high level, the third switch unit is turned on and outputs the low-level fifth level signal to the gate drive circuit, and the fourth switch unit is turned on and outputs the low-level sixth level signal to the gate drive circuit, thus the second clock signal is at the low level. Accordingly, the first clock signal is phase shifted, and a phase difference between the second clock signal after the phase shifting and the first clock signal is 90 degrees.

Figure 8:
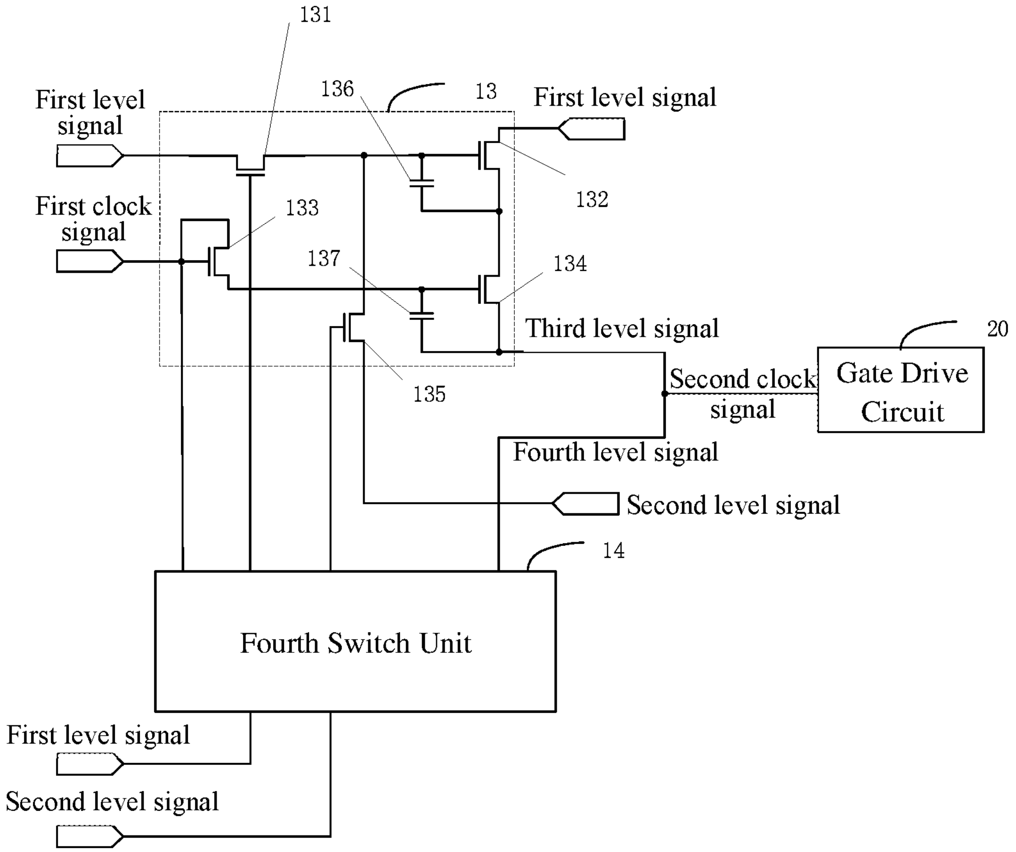
FIG. 8 is a schematic diagram of a seventh structure of the control circuit of a display panel according to an embodiment of the present application.

As shown in FIG. 8, in a further embodiment based on the embodiment corresponding to FIG. 7, the third switch unit 13 includes a ninth electronic switch 131, a tenth electronic switch 132, an eleventh electronic switch 133, a twelfth electronic switch 134, a thirteenth electronic switch 135, a second capacitor 136, and a third capacitor 137.

A drain of the ninth electronic switch 131 is connected to a gate of the tenth electronic switch 132, a source of the thirteenth electronic switch 135 and a first terminal of the second capacitor 136, respectively, and a source of the ninth electronic switch 131 is used for receiving the first level signal.

A drain of the tenth electronic switch 132 is connected to a second terminal of the second capacitor 136 and a source of the twelfth electronic switch 134, a source of the tenth electronic switch 132 is used for receiving the first level signal.

A gate and a source of the eleventh electronic switch 133 are used for receiving the first clock signal.

A gate of the twelfth electronic switch 134 is connected to a first terminal of the third capacitor 137 and a drain of the eleventh electronic switch 133, respectively.

A gate of the thirteenth electronic switch 135 is used for receiving the first clock signal.

A gate of the ninth electronic switch 131, a drain of the twelfth electronic switch 134, a drain of the thirteenth electronic switch 135, and a second terminal of the third capacitor 137 are each electrically connected to the fourth switch unit.

In practical applications, the types of the component of the ninth to thirteenth electronic switches are the same as those of the first to the fifth electronic switches described above, additionally, the types of the second capacitor and the third capacitor are the same as the type of the first capacitor described above, which will not be repeated herein, and the capacitance of the second capacitor and the third capacitor may be set according to the actual needs.

Figure 9:
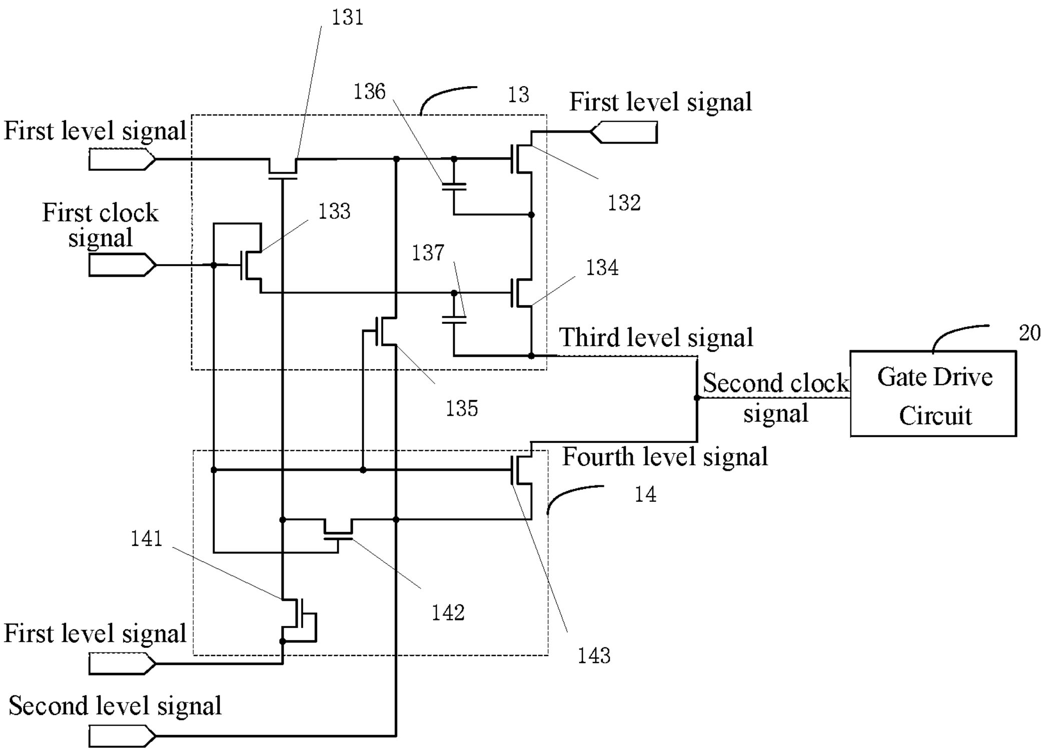
FIG. 9 is a schematic diagram of an eighth structure of the control circuit of a display panel according to an embodiment of the present application.

As shown in FIG. 9, in a further embodiment based on the embodiment corresponding to FIG. 8, the fourth switch unit 14 includes a fourteenth electronic switch 141, a fifteenth electronic switch 142, and a sixteenth electronic switch 143.

A drain of the fourteenth electronic switch 141 is connected to the gate of the ninth electronic switch and a source of the fifteenth electronic switch 142, and a gate and a source of the fourteenth electronic switch 141 are used for receiving the first level signal.

A drain of the fifteenth electronic switch 142 is connected to the drain of the thirteenth electronic switch and a source of the sixteenth electronic switch 143, respectively, and a gate of the fifteenth electronic switch 142 is used for receiving the first clock signal and the drain of the fifteenth electronic switch 142 is used for receiving the second level signal.

A drain of the sixteenth electronic switch 143 is connected to the drain of the twelfth electronic switch and the second terminal of the third capacitor, respectively, and a gate of the sixteenth electronic switch 143 is used for receiving the first clock signal.

In practical applications, the types of the component of the fourteenth to sixteenth electronic switches are the same as those of the first to the fifth electronic switches described above, which will not be repeated herein.

Figure 10:
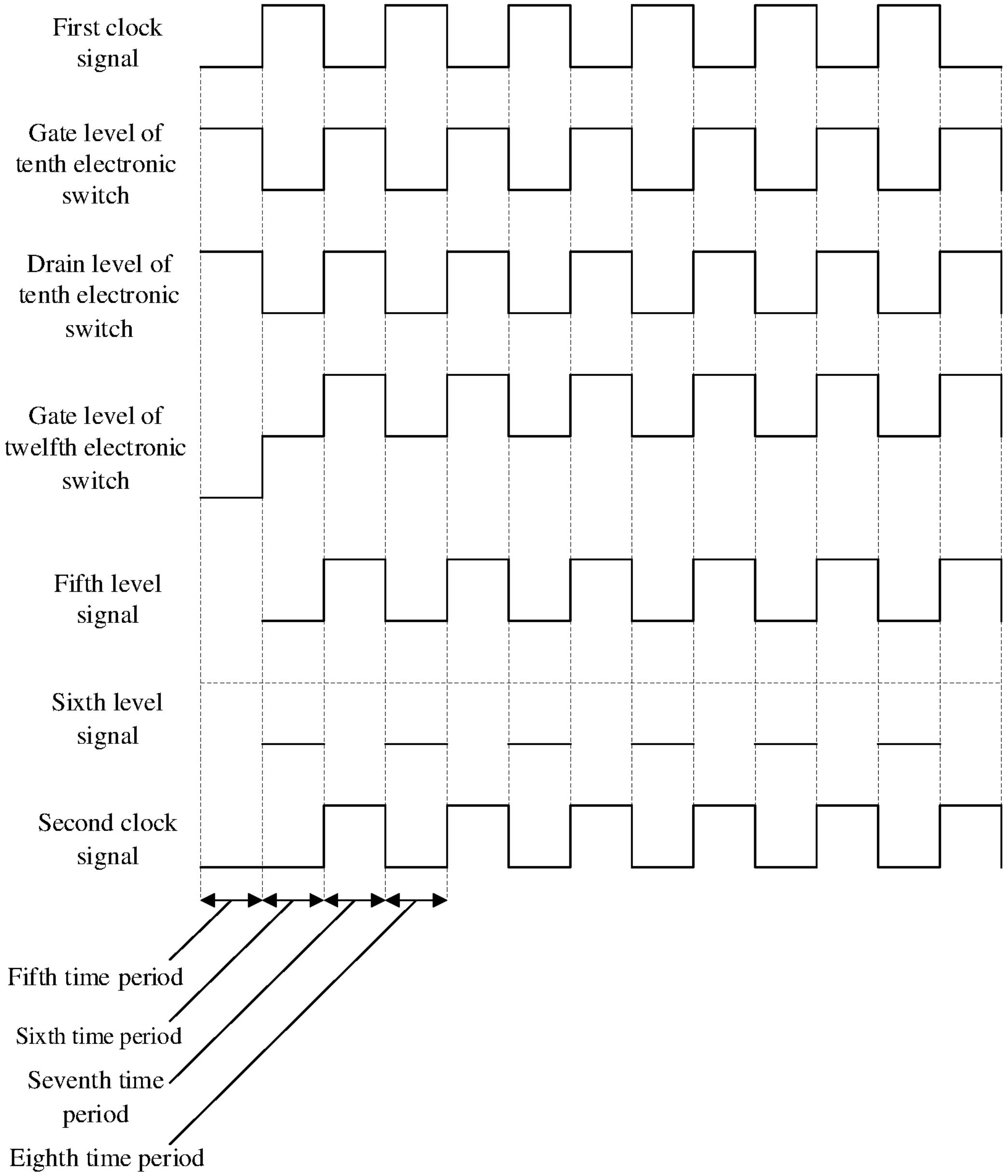
FIG. 10 is a sequence diagram of the first clock signal, the gate level of the tenth electronic switch, the drain level of the tenth electronic switch, the gate level of the twelfth electronic switch, the fifth level signal, the sixth level signal and the second clock signal according to an embodiment of the present application.

FIG. 10 illustrates an exemplary sequence diagram of the first clock signal, the gate level of the tenth electronic switch, the drain level of the tenth electronic switch, the gate level of the twelfth electronic switch, the fifth level signal, the sixth level signal, and the second clock signal.

In a practical application, the first level signal is always at a high level, and the second level signal is always at a low level, and the first clock signal is a periodic clock signal, where a phase difference between the adjacent rising and falling edges of the first clock signal is 90 degrees. The gate and source of the fourteenth electronic switch always receive the first level signal, thus the drain level of the fourteenth electronic switch is always high. The control circuit is in a standby state before entering the operating state. The control circuit is in a first standby state during the fifth time period, and the first clock signal is at a low level, hence the eleventh electronic switch, the thirteenth electronic switch, the fifteenth electronic switch and the sixteenth electronic switch are turned off. The high level at the drain of the fourteenth electronic switch is output to the gate of the ninth electronic switch, which enables the ninth electronic switch to be turned on. Since the source of the ninth electronic switch receives the first level signal, so the drain level of the ninth electronic switch is high, thereby resulting in a high gate level of the tenth electronic switch. Correspondingly, the tenth electronic switch is on and the drain level of the tenth electronic switch is at the high level. As the eleventh electronic switch is off, the gate level of the twelfth electronic switch is low so that the twelfth electronic switch is also turned off. The drain level of the twelfth electronic switch is the fifth level signal, thus the twelfth electronic switch does not output the fifth level signal. Since the sixteenth electronic switch is off and the drain level of the sixteenth electronic switch is the sixth level signal, thus the sixteenth electronic switch does not output the sixth level signal. Accordingly, since neither the fifth level signal nor the sixth level signal is output, the second clock signal is low.

In a practical application, the control circuit is in the second standby state during a sixth time period, and the first clock signal changes from the low level in the fifth time period to a high level. The fifteenth electronic switch is on as the gate of the fifteenth electronic switch receives the high-level first clock signal, thus the high-level output from the drain of the fourteenth electronic switch can be released through the fifteenth electronic switch and the second level signal, so that the gate level of the ninth electronic switch drops from the high level to the low level, causing the ninth electronic switch to be turned off. Also, as the gate of the thirteenth electronic switch receives the high-level first clock signal, the thirteenth electronic switch is turned on, and the high level at the source of the thirteenth electronic switch is released via the thirteenth electronic switch and the second level signal, therefore, as the ninth electronic switch is turned off, the gate level of the tenth electronic switch drops from the high level to the low level, causing the tenth electronic switch to be turned off. Additionally, the voltage at the drain of the tenth electronic switch is reduced due to the coupling effect of the second capacitor, so that the drain level of the tenth electronic switch is low. Since the first clock signal is at the high level, the eleventh electronic switch is on, and the gate level of the twelfth electronic switch is high, thus the twelfth electronic switch is on, and the drain level of the twelfth electronic switch is low, and thus the fifth level signal is at the low level. Since the first clock signal is at the high level, the sixteenth electronic switch is turned on and the source of the sixteenth electronic switch receives the second level signal, so that the drain level of the sixteenth electronic switch is low and thus the sixth level signal is at the low level. Accordingly, as the fifth and sixth level signals are both at the low level, so that the second clock signal is at the low level.

In a practical application, the control circuit is in the first operating state during a seventh time period, while the second clock signal is at the high level and the first clock signal changes from the high level in the sixth time period to the low level. Accordingly, the fifteenth electronic switch is off, and the ninth electronic switch is on. The current gate level of the tenth electronic switch is high, so the tenth electronic switch is on, so that the drain level of the tenth electronic switch is high as the source of the tenth electronic switch receives the first level signal. The voltage at the gate of the tenth electronic switch rises further due to the coupling effect of the third capacitor, which further ensures the conduction of the tenth electronic switch. Since the first clock signal is low, the eleventh electronic switch is turned off, hence the voltage at the gate of the twelfth electronic switch is a float voltage. The voltage at the gate of the twelfth electronic switch is assumed to be the third voltage, and the gate level of the twelfth electronic switch remains high, so that the twelfth electronic switch is on, and with the high drain level of the twelfth electronic switch, the fifth level signal is also at the high level. The thirteenth electronic switch, the fifteenth electronic switch and the sixteenth electronic switch are switched off due to the low level of the first clock signal, and the output of the sixth level signal is thus stopped as the sixteenth electronic switch is turned off. Since the fifth level signal is at the high level and the output of the sixth level signal is stopped, the second clock signal is at the high level. In addition, the voltage at the gate of the twelfth electronic switch is currently the third voltage due to the high-level fifth level signal and the float voltage at the gate of the twelfth electronic switch, and the voltage at the gate of the twelfth electronic switch rises to a fourth voltage as a result of the coupling effect of the third capacitor, which further ensures the conduction of the twelfth electronic switch. The value of the third voltage is determined by the voltage when the first clock signal is at the high level, and the value of the fourth voltage is determined by the voltage when the first clock signal is at the high level, the voltage of the first level signal and the coupling effect of the third capacitor.

In practical applications, the eighth time period is the time period when the second clock signal is at the low level, and the control circuit is in the second operating state, and the second operating state of the control circuit is consistent with the first standby state of the control circuit described above, which will not be repeated here. The difference is that the float voltage at the gate of the twelfth electronic switch is released because the first clock signal is at the high level such that the eleventh electronic switch is on, and the voltage at the gate of the twelfth electronic switch is restored from the fourth voltage to the third voltage.

In practical applications, the state of the control circuit changes with the level of the first clock signal after the preparation in the fifth time period and the sixth time period. Specifically, when the first clock signal is at the low level, the operating state of the control circuit is the same as the first operating state in the seventh time period mentioned above, and when the first clock signal is at the high level, the operating state of the control circuit is the same as the second operating state in the fourth time period mentioned above, so that the phase difference between the second clock signal output by the control circuit and the first clock signal is 90 degrees. In comparison with the control circuit consisting of the first and second switch units, the control circuit consisting of the third and fourth switch units further ensures the conduction of the third switch unit, thus the reliability of the output of the shifted clock signal.

The control circuit of a display panel provided in the first aspect of the present application is configured to receive a first clock signal, a first level signal and a second level signal, and the first clock signal is phase-shifted to obtain a second clock signal to be output to a gate drive circuit according to the first level signal and the second level signal. The phase-shifting of the clock signal reduces the load of individual clock signals as well as the number of clock generators in the display panel, and lowers the production cost of the display panel.

Figure 11:
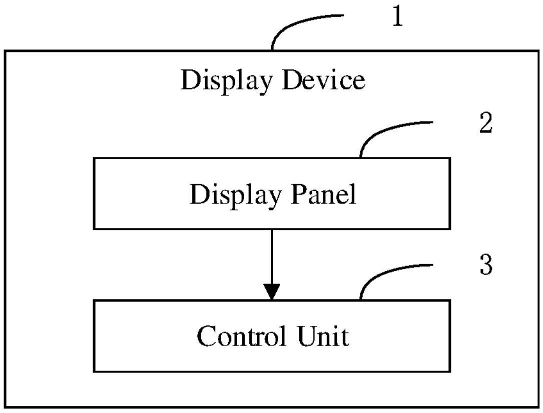
FIG. 11 is a schematic diagram of the structure of the display device according to an embodiment of the present application.

As shown in FIG. 11, an embodiment of the present application also provides a display device 1, which includes a display panel 2 and a control unit 3, and the control unit 3 includes the above-mentioned control circuit.

The control unit includes a memory, a processor and a computer program stored on the memory and executable by the processor, and the processor executes the computer program to implement the functions of the control circuit of a display panel in the above-mentioned embodiments.

In practical applications, the processor may be a time control register (TCON) or a system on chip (SOC), or may be a central processing unit (CPU), the processor may also be another general-purpose processor, digital signal processor (DSP), application specific integrated circuit (ASIC), field-programmable gate array (FPGA) or other programmable logic devices, discrete gate or transistor logic devices, discrete hardware components, and the like. The general-purpose processor may be a microprocessor or the processor may be any conventional processor, and the like.

In practical applications, in some embodiments, the memory may be an internal storage unit of a terminal device, such as a hard disk or memory of the terminal device. In other embodiments, the memory may also be an external storage device of the terminal device, such as a plug-in hard disk, smart media card (SMC), secure digital (SD) card, flash card, and the like, provided on the terminal device. Further, the memory may also include both internal storage units and external storage devices of the terminal device. The memory is used to store operating systems, applications, boot loaders, data, and other programs, such as program codes for computer programs, etc. The memory can also be used to temporarily store data that has been output or will be output.

The above-mentioned embodiments are merely for the purpose of illustrating the technical proposal of the present application, not for limiting; although the application is described in detail with reference to the foregoing embodiments, it should be understood by those of ordinary skill in the art that it is still possible to modify the technical proposal described in the foregoing embodiments, or to replace some of the technical features with the equivalent; and these modifications or replacements do not cause the essence of the corresponding technical proposal to depart from the spirit and scope of the technical proposal of the embodiments of this application, and shall be included in the scope of protection of this application.

What is claimed is:

1. A control circuit of a display panel, wherein the control circuit is configured to receive a first clock signal, a first level signal and a second level signal, phase-shift the first clock signal to obtain a second clock signal according to the first level signal and the second level signal, and output the second clock signal to a gate drive circuit; wherein the second clock signal comprises a third level signal and a fourth level signal, the third level signal and the fourth level signal are at different levels;

the control circuit comprises: a first switch unit and a second switch unit connected to the first switch unit;

the first switch unit is configured to receive the first clock signal, the first level signal and the second level signal, and output the third level signal to the gate drive circuit based on the first clock signal, the first level signal and the second level signal; and the second switch unit is configured to receive the first clock signal, the first level signal and the second level signal, and output the fourth level signal to the gate drive circuit according to the first clock signal, the first level signal and the second level signal.

2. The control circuit of a display panel according to claim 1, wherein when the first clock signal is at a low level, the first switch unit is turned on and outputs the third level signal to the gate drive circuit based on the first clock signal, the first level signal and the second level signal, and the third level signal is at a high level.

3. The control circuit of a display panel according to claim 1, wherein when the first clock signal is at a high level, the first switch unit is turned off and stops outputting the third level signal to the gate drive circuit based on the first clock signal, the first level signal and the second level signal.

4. The control circuit of a display panel according to claim 1, wherein when the first clock signal is at a high level, the second switch unit is turned on and outputs the fourth level signal to the gate drive circuit based on the first clock signal, the first level signal and the second level signal, and the fourth level signal is at a low level.

5. The control circuit of a display panel according to claim 1, wherein when the first clock signal is at a low level, the second switch unit is turned off and stops outputting the fourth level signal to the gate drive circuit based on the first clock signal, the first level signal and the second level signal.

6. The control circuit of a display panel according to claim 1, wherein the first switch unit comprises a first electronic switch, a second electronic switch, a third electronic switch, a fourth electronic switch, a fifth electronic switch, and a first capacitor;

wherein a drain of the first electronic switch is connected to a gate of the second electronic switch, and a gate and a source of the first electronic switch is configured to receive the first clock signal;

wherein a drain of the second electronic switch is connected to a source of the fourth electronic switch, and a source of the second electronic switch is configured to receive the first level signal;

wherein a drain of the third electronic switch is connected to a source of the fifth electronic switch and a gate of the fourth electronic switch, respectively, and a source of the third electronic switch is configured to receive the first level signal;

wherein a first terminal of the first capacitor is connected to the drain of the first electronic switch and the gate of the second electronic switch, respectively, and a drain of the fifth electronic switch is configured to receive the second level signal; and wherein a gate of the third electronic switch, the drain of the fifth electronic switch, a drain of the fourth electronic switch, and a second terminal of the first capacitor are electrically connected to the second switch unit.

7. The control circuit of a display panel according to claim 6, wherein the second switch unit comprises a sixth electronic switch, a seventh electronic switch, and an eighth electronic switch;

a drain of the sixth electronic switch is connected to the gate of the third electronic switch and a source of the seventh electronic switch, respectively, and a gate and a source of the sixth electronic switch is configured to receive the first level signal;

a drain of the seventh electronic switch is connected to the drain of the fifth electronic switch and a source of the eighth electronic switch, respectively, a gate of the seventh electronic switch is configured to receive the first clock signal, and the drain of the seventh electronic switch is configured to receive the second level signal; and a drain of the eighth electronic switch is connected to the drain of the fifth electronic switch and the second terminal of the first capacitor, and a gate of the eighth electronic switch is configured to receive the first clock signal.

8. The control circuit of a display panel according to claim 1, wherein the control circuit comprises:

a third switch unit for receiving the first clock signal, the first level signal and the second level signal;

wherein when the first clock signal is at a high level, the third switch unit is turned on and outputs a fifth level signal to the gate drive circuit based on the first clock signal, the first level signal and the second level signal, and the fifth level signal is at a high level; and wherein when the first clock signal is at a low level, the third switch unit is turned on and outputs the fifth level signal to the gate drive circuit based on the first clock signal, the first level signal and the second level signal, and the fifth level signal is at a low level.

9. The control circuit of a display panel according to claim 8, wherein the third switch unit comprises a ninth electronic switch, a tenth electronic switch, an eleventh electronic switch, a twelfth electronic switch, a thirteenth electronic switch, a second capacitor, and a third capacitor;

wherein a drain of the ninth electronic switch is connected to a gate of the tenth electronic switch, a source of the thirteenth electronic switch and a first terminal of the second capacitor, respectively, and a source of the ninth electronic switch is configured to receive the first level signal;

wherein a drain of the tenth electronic switch is connected to a second terminal of the second capacitor and a source of the twelfth electronic switch, and a source of the tenth electronic switch is configured to receive the first level signal;

a gate and a source of the eleventh electronic switch are configured to receive the first clock signal;

a gate of the twelfth electronic switch is connected to a first terminal of the third capacitor and a drain of the eleventh electronic switch, respectively;

a gate of the thirteenth electronic switch is configured to receive the first clock signal; and a gate of the ninth electronic switch, a drain of the twelfth electronic switch, a drain of the thirteenth electronic switch, and a second terminal of the third capacitor are each electrically connected to a fourth switch unit.

10. The control circuit of a display panel according to claim 9, wherein, the fourth switch unit comprises a fourteenth electronic switch, a fifteenth electronic switch, and a sixteenth electronic switch;

wherein a drain of the fourteenth electronic switch is connected to the gate of the ninth electronic switch and a source of the fifteenth electronic switch, and a gate and a source of the fourteenth electronic switch are configured to receive the first level signal;

wherein a drain of the fifteenth electronic switch is connected to the drain of the thirteenth electronic switch and a source of the sixteenth electronic switch, respectively, a gate of the fifteenth electronic switch is configured to receive the first clock signal, and the drain of the fifteenth electronic switch is configured to receive the second level signal; and wherein a drain of the sixteenth electronic switch is connected to the drain of the twelfth electronic switch and the second terminal of the third capacitor, respectively, and a gate of the sixteenth electronic switch is configured to receive the first clock signal.

11. The control circuit of a display panel according to claim 1, wherein the control circuit comprises:

a fourth switch unit connected to a third switch unit, the fourth switch unit is configured to receive the first clock signal, the first level signal and the second level signal;

wherein when the first clock signal is at a high level, the fourth switch unit is turned on and outputs a sixth level signal to the gate drive circuit based on the first clock signal, the first level signal and the second level signal, and the sixth level signal is at a low level;

wherein when the first clock signal is at a low level, the fourth switch unit is turned off and stops outputting the sixth level signal based on the first clock signal, the first level signal and the second level signal; and wherein the second clock signal comprises the fifth level signal and the sixth level signal.

12. The control circuit of a display panel according to claim 1, wherein the first level signal is a high-level signal and the second level signal is a low-level signal.

13. The control circuit of a display panel according to claim 1, wherein a phase difference between the second clock signal and the first clock signal ranges from 0 to 180 degrees.

14. The control circuit of a display panel according to claim 1, wherein the control circuit is configured to determine a phase difference between the second clock signal and the first clock signal based on a time sequence of the first level signal and the second level signal.

15. A display device, comprising:

a display panel; and a control unit comprising a control circuit;

wherein the control circuit is configured to receive a first clock signal, a first level signal and a second level signal, phase-shift the first clock signal to obtain a second clock signal according to the first level signal and the second level signal, and output the second clock signal to a gate drive circuit; wherein the second clock signal comprises a third level signal and a fourth level signal, the third level signal and the fourth level signal are at different levels;

the control circuit comprises a first switch unit and a second switch unit connected to the first switch unit;

the first switch unit is configured to receive the first clock signal, the first level signal and the second level signal, and output the third level signal to the gate drive circuit based on the first clock signal, the first level signal and the second level signal; and the second switch unit is configured to receive the first clock signal, the first level signal and the second level signal, and output the fourth level signal to the gate drive circuit according to the first clock signal, the first level signal and the second level signal.

16. The display device according to claim 15, wherein when the first clock signal is at a low level, the first switch unit is turned on and outputs the third level signal to the gate drive circuit based on the first clock signal, the first level signal and the second level signal, and the third level signal is at a high level.

17. The display device according to claim 15, wherein when the first clock signal is at a high level, the first switch unit is turned off and stops outputting the third level signal to the gate drive circuit based on the first clock signal, the first level signal and the second level signal.

18. The display device according to claim 15, wherein when the first clock signal is at a high level, the second switch unit is turned on and outputs the fourth level signal to the gate drive circuit based on the first clock signal, the first level signal and the second level signal, and the fourth level signal is at a low level.

19. The display device according to claim 15, wherein when the first clock signal is at a low level, the second switch unit is turned off and stops outputting the fourth level signal to the gate drive circuit based on the first clock signal, the first level signal and the second level signal.

20. The display device according to claim 15, wherein the first switch unit comprises a first electronic switch, a second electronic switch, a third electronic switch, a fourth electronic switch, a fifth electronic switch, and a first capacitor;

wherein a drain of the first electronic switch is connected to a gate of the second electronic switch, and a gate and a source of the first electronic switch is configured to receive the first clock signal;

wherein a drain of the second electronic switch is connected to a source of the fourth electronic switch, and a source of the second electronic switch is configured to receive the first level signal;

wherein a drain of the third electronic switch is connected to a source of the fifth electronic switch and a gate of the fourth electronic switch, respectively, and a source of the third electronic switch is configured to receive the first level signal;

wherein a first terminal of the first capacitor is connected to the drain of the first electronic switch and the gate of the second electronic switch, respectively, and a drain of the fifth electronic switch is configured to receive the second level signal; and wherein a gate of the third electronic switch, the drain of the fifth electronic switch, a drain of the fourth electronic switch, and a second terminal of the first capacitor are electrically connected to the second switch unit.

* * * * *